United States Patent
Jiang et al.

(10) Patent No.: US 10,009,160 B2
(45) Date of Patent: Jun. 26, 2018

(54) SYSTEM AND METHOD FOR LOW LATENCY ACKNOWLEDGEMENTS

(71) Applicant: QUALCOMM Incorporated, San Diego, CA (US)

(72) Inventors: Jing Jiang, San Diego, CA (US); Joseph Binamira Soriaga, San Diego, CA (US); Tingfang Ji, San Diego, CA (US); Krishna Kiran Mukkavilli, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 14/938,790

(22) Filed: Nov. 11, 2015

(65) Prior Publication Data
US 2016/0269164 A1 Sep. 15, 2016

Related U.S. Application Data

(60) Provisional application No. 62/133,209, filed on Mar. 13, 2015.

(51) Int. Cl.
*H04W 4/00* (2018.01)
*H04L 5/00* (2006.01)
(Continued)

(52) U.S. Cl.
CPC ........... *H04L 5/0055* (2013.01); *H04B 7/086* (2013.01); *H04L 1/0052* (2013.01);
(Continued)

(58) Field of Classification Search
None
See application file for complete search history.

(56) References Cited

U.S. PATENT DOCUMENTS 7,496,076 B2  2/2009  Takagi et al.
8,064,461 B2  11/2011  Nishida et al.
(Continued)

FOREIGN PATENT DOCUMENTS

WO  2004/006613  1/2004
WO  2010/005660  1/2010

OTHER PUBLICATIONS

International Search Report—PCT/US2016/017623—ISA/EPO—dated May 30, 2016.
Written Opinion—PCT/US2016/017623—ISA/EPO dated May 30, 2016.

*Primary Examiner* — Rebecca E Song
(74) *Attorney, Agent, or Firm* — Haynes and Boone, LLP

(57) ABSTRACT

A system and method for low latency acknowledgements includes a communication unit that includes a processor, a transmitter coupled to the processor, and a receiver coupled to the processor. The communication unit is configured to transmit a message to another communication unit, receive a first group of one or more repetitions of an acknowledgement signal from the another communication unit, and decode the acknowledgement signal prior to fully receiving a last repetition of a second group of one or more repetitions of the acknowledgement signal. The acknowledgement signal has a partially decodable structure. In some embodiments, each of the are repetitions of a same time domain waveform received during one symbol period. In some embodiments, a frequency domain characteristic of the time domain waveform consists of one non-zero tone for every K tones, K being equal to a sum of a number of repetition in the first and second groups.

22 Claims, 7 Drawing Sheets

(51) Int. Cl.
*H04L 1/18* (2006.01)
*H04B 7/08* (2006.01)
*H04W 72/04* (2009.01)
*H04L 1/00* (2006.01)
*H04L 25/03* (2006.01)

(52) U.S. Cl.
CPC .......... *H04L 1/1812* (2013.01); *H04L 1/1858* (2013.01); *H04W 72/0453* (2013.01); *H04L 25/03834* (2013.01)

(56) References Cited

U.S. PATENT DOCUMENTS

| | | | |
|---|---|---|---|
| 8,488,567 B2 | 7/2013 | Papasakellariou et al. | |
| 2005/0226208 A1* | 10/2005 | Moorti | H04L 27/2613 370/350 |
| 2010/0284352 A1* | 11/2010 | Lee | H04L 1/1854 370/329 |
| 2012/0106408 A1* | 5/2012 | Papasakellariou | H04L 1/1614 370/280 |
| 2013/0077606 A1* | 3/2013 | Wu | H04B 7/2656 370/336 |
| 2014/0198739 A1 | 7/2014 | Kenney et al. | |
| 2015/0043595 A1 | 2/2015 | Reina et al. | |

* cited by examiner

SYSTEM AND METHOD FOR LOW LATENCY ACKNOWLEDGEMENTS

RELATED APPLICATIONS

The present application claims priority to U.S. Provisional Patent Application No. 62/133,209, entitled "System and Method for Low Latency Acknowledgements," which was filed Mar. 13, 2015, which is hereby incorporated by reference in its entirety.

TECHNICAL FIELD

The present disclosure relates generally to communication methods for computing devices, and more particularly to low latency acknowledgements.

BACKGROUND

Many of today's communication systems, such as third generation (3G), fourth generation (4G), and fifth generation (5G) mobile phone networks, exchange data and other information using one or more complex signaling and/or messaging protocols. One of the goals of these communication systems is the reliable and accurate exchange of data between base stations and user equipment (UE). For example, protocols using hybrid automatic repeat requests (HARQ) use combinations of error-detecting codes and/or error correcting codes to determine when messages contain errors and to automate the correction of the errors without having to retransmit the messages. To support error detection and/or correction, HARQ introduces overhead into the communication system that may reduce the efficiency in the use of the communication channels.

Accordingly, it would be desirable to provide systems and methods for increasing the efficiency of communications, such as by reducing the round trip time between the transmitting of a message and a corresponding acknowledgement of that message.

SUMMARY

According to some embodiments a communication unit includes a processor, a transmitter coupled to the processor, and a receiver coupled to the processor. The processor is configured to transmit, using the transmitter, a data message to another communication unit on a data channel, receive, using the receiver, a first group of one or more repetitions of an acknowledgement signal from the another communication unit on a control channel, and decode the acknowledgement signal prior to fully receiving, via the receiver, a last repetition of a second group of one or more repetitions of the acknowledgement signal on the control channel. The acknowledgement signal has a partially decodable structure.

According to some embodiments a method of transmitting messages includes transmitting, by a sender, a data message to a receiver on a data channel, receiving, by the sender, a first group of one or more repetitions of an acknowledgement signal from the receiver on a control channel, and decoding, by the sender the acknowledgement signal prior to fully receiving a last repetition of a second group of one or more repetitions of the acknowledgement signal on the control channel. The acknowledgement signal has a partially decodable structure;

According to some embodiments a communication unit includes a processor, a transmitter coupled to the processor, and a receiver coupled to the processor. The processor is configured to receive, via the receiver, a data message from another communication unit on a data channel, decode the data message, and transmit, via the transmitter and in response to the decoding, an acknowledgement signal on a control channel to the another communication unit. The acknowledgement signal has a partially decodable structure.

According to some embodiments, a means for communication unit includes means for transmitting a data message to another communication unit on a data channel means, means for receiving a first group of one or more repetitions of an acknowledgement signal from the another communication unit on a control channel means, the acknowledgement signal having a partially decodable structure, and means for decoding the acknowledgement signal prior to fully receiving, via the means for receiving, a last repetition of a second group of one or more repetitions of the acknowledgement signal on the control channel means.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
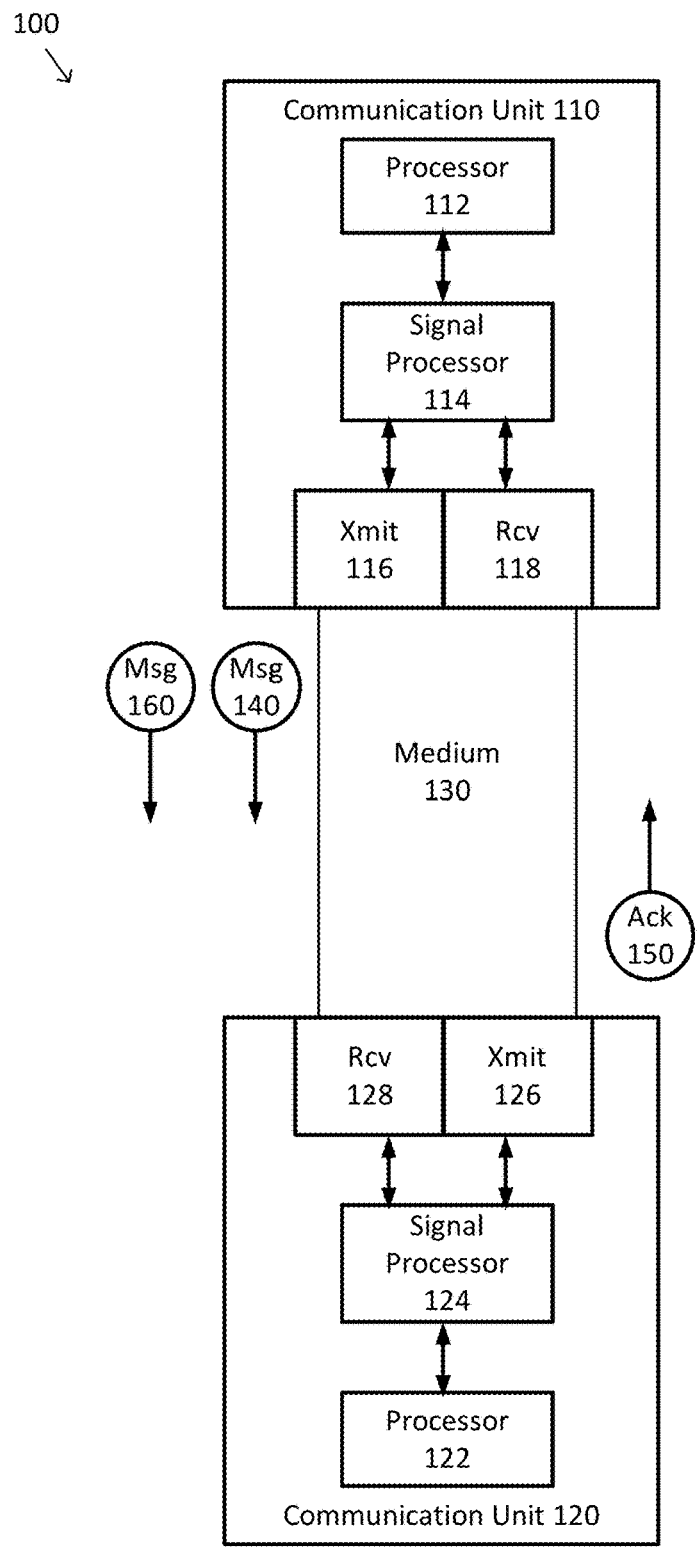
FIG. 1 is a simplified diagram of a communication system according to some embodiments.

FIG. 1 is a simplified diagram of a communication system 100 according to some embodiments. As shown in FIG. 1, includes two communication units 110 and 120 coupled together using a medium 130. In some examples, communication units 110 and 120 may each be representative of any type of communication unit typically found in modern networks, such as a network node, a switch, a router, a wireless access point, a server, a workstation, a PC, a tablet, a mobile phone, a smart phone, a user equipment, a base station, and/or the like. In some examples, communication units 110 and 120 may each be an integrated circuit, system on a chip (SoC), and/or the like incorporated in another communication and/or computing device such as a network node, a switch, a router, a wireless access point, a server, a workstation, a PC, a tablet, a mobile phone, a smart phone, a user equipment, a base station, and/or the like. As shown, communication unit 110 includes a processor 112, a signal processor 114, a transmitter 116, and a receiver 118. Similarly, communication unit 120 includes a processor 122, a signal processor 124, a transmitter 126, and a receiver 128. In some examples, processors 112 and/or 122 may control operation and/or execution of hardware and/or software of the respective communication unit 110 and/or 120. Although only one processor 112 or 122 is shown, communication units 110 and/or 120 may each include multiple processors, multi-core processors, field programmable gate arrays (FPGAs), application specific integrated circuits (ASICs), and/or the like. In some examples, signal processors 114 and/or 124 may be responsible for analyzing signals, modulating and/or demodulating signals, and/or the like for the respective communication unit 110 and/or 120 and/or the respective processor 112 and/or 122. Although only one signal processor 114 or 124 is shown, communication units 110 and/or 120 may each include multiple signal processors such as digital signal processors (DSPs), coder-decoders (CODECs), modulator-demodulators (MODEMs), FPGAs, ASICs, and/or the like.

Transmitters 116 and/or 126 in cooperation with receivers 128 and/or 118 may be responsible for exchanging information, data, control information, metadata, and/or the like between communication units 110 and/or 120. In some examples, transmitter 116 may transmit one or more signals, messages, packets, and/or the like using medium 130 to receiver 128 and transmitter 126 may transmit one or more signals, messages, packets, and/or the like using medium 130 to receiver 118. In some examples, medium 130 may be any kind of transmission medium suitable for exchanging information and data. In some examples, medium 130 may include one or more wires and/or cables such as coaxial cables, twisted-pair cables, wires, and/or the like. In some examples, medium 130 may be a wireless medium (e.g., air) with or without one or more wave guides. In some examples, medium 130 may be a shared medium supporting multiple simultaneous signals using one or more forms of multiplexing including time division multiplexing, frequency division multiplexing, spread spectrum, and/or the like to create multiple channels in medium 130. In some examples, medium 130 may be used to simultaneously carry signals transmitted from transmitter 116 to receiver 128 and from transmitter 126 to receiver 118. In some examples, medium 130 may also be used to simultaneously carry signals transmitted to and received by communication units other than communication units 110 and/or 120.

Although not shown in FIG. 1, one of ordinary skill would recognize that different combinations of internal devices are possible for communication units 110 and/or 120 that are consistent with the various embodiments described in further detail below. In some examples, one or more of signal processors 114 and 124 may be omitted, transmitter 116 and receiver 118 may be part of a combined transceiver, transmitter 126 and receiver 128 may be part of a combined transceiver, and/or the like. In some examples, communication units 110 and/or 120 may additionally include memory (not shown). In some examples, the memory may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

According to some embodiments, and without loss of generality, use of communication system 100 to send data is described for the transmitting of data from communication unit 110 (sometimes referred to as the sender) to communication unit 120 (sometimes referred to as the receiver). One of ordinary skill would understand that the roles of communication units 110 and 120 may be reversed when communication unit 120 transmits data to communication unit 110 and/or communication units 110 and 120 may simultaneously be transmitting data to each other. As shown in FIG. 1, the transmitting of the data from communication unit 110 to communication unit 120 is described beginning with the transmitting of a message or data packet 140 by transmitter 116 of communication unit 110. In some examples, message 140 may be generated by processor 112, passed to signal processor 114 for further processing, and then provided by signal processor 114 to transmitter 116. Message 140 is then transmitted by transmitter 116 using medium 130. When message 140 is received by receiver 126, it may be passed to signal processor 124 and/or processor 122 for analysis. As part of the analysis within communication unit 120, message 140 may be examined to determine whether it has been received error-free by receiver 128. In some examples, the analysis may include utilizing error detection codes and/or error correction codes within message 140 to determine whether message 140 is error free and/or may be corrected to an error free state. In some examples, the error detection and/or correction codes may include one or more parity bits, check sums, cyclic redundancy check (CRC) codes, hamming codes, and/or the like.

Based on whether message 140 is received error-free, communication unit 120 may formulate a response to message 140 in the form of an acknowledgement message 150 for transmitting back to communication unit 110 over medium 130 using transmitter 126 and receiver 118. In some examples, acknowledgement message 150 may include a positive acknowledgement when message 140 is received error free, a negative acknowledgement when message 140 is received with errors, a request for error correction codes, and/or the like. In some examples, acknowledgement message 150 may be transmitted in piggy-back fashion along with other data being transmitted in a message from communication unit 120 to communication unit 110.

In response to receiving acknowledgement message 150, communication unit 110 examines acknowledgement message 150 to determine what type of acknowledgement is included therein. Based on the type of acknowledgement included in acknowledgement message 150, communication unit 110 may send another message or data packet 160 to communication unit 120 over medium 130 using transmitter 116 and receiver 128. When the acknowledgement is a positive acknowledgement, message 160 may include a next data packet for communication unit 120. When the acknowledgement is a negative acknowledgement, message 160 may include a retransmitting of the data from message 140. And, when the acknowledgement is a request for error correction codes, message 160 may include the error correction codes for message 140 as is described further below.

According to some embodiments, communications units 110 and/or 120 may encode the signals and/or messages 140, 150, and/or 160 using protocols involving hybrid automatic repeat requests (HARQs). The HARQ protocols typically use a combination of error detecting codes and/or error correcting codes to help improve data transmission reliability. In some examples, when Type I HARQ is used, each message, such as messages 140 and/or 160, transmitted by a sender, such as communication unit 110, includes both error detecting codes and error correcting codes. When a receiver, such as communication unit 120, receives the message, the error detecting codes may be used to determine whether there are errors in the message and the error correcting codes may be used to recover an error-free version of the message. In cases where the signal quality is too low and there are too many errors, the message is rejected and the receiver requests that the sender retransmit the message, such as by sending acknowledgement message 150 with a negative acknowledgement. In some examples, when Type II HARQ is used, each message transmitted includes just the error detecting codes. When the receiver detects an error, the receiver may then request that the sender transmit the error correcting codes, such as by sending acknowledgement 150 with a request for error correcting codes. After receiving the error correcting codes, the receiver attempts to recover an error-free version of the message, and when the receiver cannot recover an error-free version of the message, the receiver requests that the transmitter retransmit the message, such as by sending acknowledgement message 150 with a negative acknowledgement. Type I HARQ is typically more efficient in low quality signal channels and Type II HARQ is typically more efficient in higher quality signal channels.

As shown in FIG. 1, a common feature of both Type I HARQ and Type II HARQ, as well as stop and wait and/or sliding windows protocols, is that the receiver of a data message 140 transmits a status or acknowledgement message 150 to the transmitter to indicate the status of the data messages that are received. In Type I HARQ, this may include both acknowledgements of the ability to obtain an error-free version of the message (e.g., a positive acknowledgement) or to request a resend (e.g., a negative acknowledgement). In Type II HARQ, this may include acknowledgements of the ability to obtain an error-free version of the message (e.g., a positive acknowledgement), a request for the error correcting codes, or a request for a resend (e.g., a negative acknowledgement). In some examples, the status and/or acknowledgement messages 150 may be sent in a separate control channel from the data channel used to transmit the data messages 140.

One way to reduce the overhead of the acknowledged messaging, and thus increase transmission efficiency, is to reduce the amount of latency or round trip time (RTT) between the transmitting of the data message 140 by the sender and the receipt and decoding, by the sender, of the status or acknowledgement message 150 returned by the receiver. When the round trip time is reduced, the sender may be able to more quickly transmit the error correcting codes (e.g., for Type II HARQ), retransmit the data message, and/or transmit the next data message as shown by message 160. Thus, less communication channel time is spent waiting for the status and/or acknowledgement messages 150 and more of the communication channel bandwidth may be used for data transmission.

One way to reduce the latency or RTT time before the status and/or acknowledgement messages 150 are received and decoded by the sender of data message 140 is to use a signal structure for the status and/or acknowledgement messages 150 that could be decoded within a shorter period of time in comparison to reception of the full transmitted acknowledgement message. According to some embodiments, one such signal structure employing a shorter reception period is to encode status and/or acknowledgement message 150 using an acknowledgement signal with a partially decodable signal structure. In some examples, a benefit of the proposed partially decodable symbol structure is to have the receiver of data message 140 (i.e., the transmitter of acknowledgement message 150) send acknowledgement message 150 using a same symbol duration as other regular data/control symbols to maintain orthogonality and limit interference with other communication channels, while enabling partial symbol processing and decoding of acknowledgement message 150 to achieve a reduction in latency and/or RTT.

Figure 2:
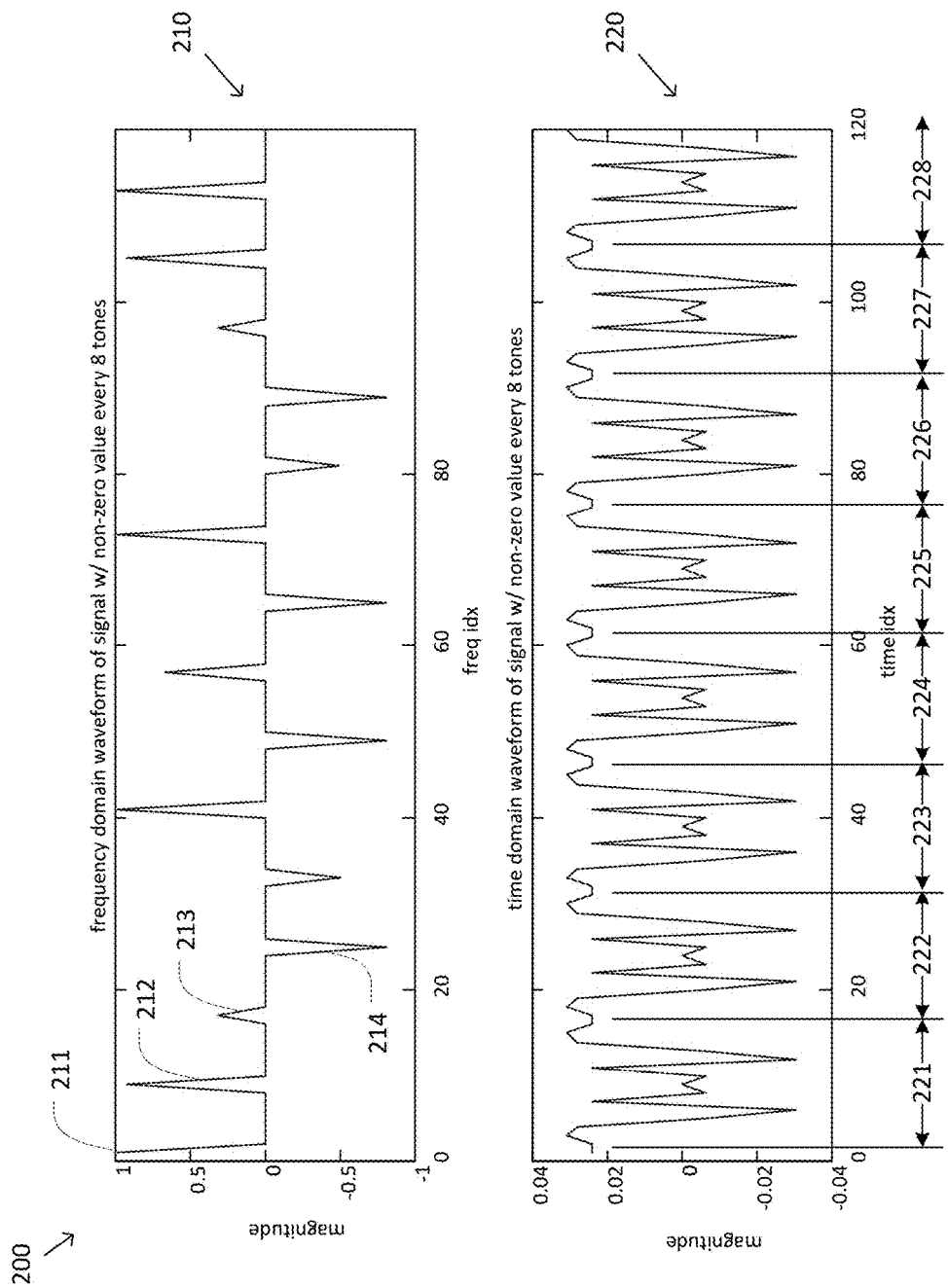
FIG. 2 is a simplified diagram of an acknowledgement signal having a partially decodable structure according to some embodiments.

FIG. 2 is a simplified diagram of an acknowledgement signal 200 having a partially decodable structure according to some embodiments. As shown in FIG. 2, acknowledgement signal 200 includes a frequency domain characteristic 210 where one non-zero tone is sent for every K tones. In the example, K is eight, and frequency domain characteristic 210 includes a non-zero component at every eighth tone in the frequency spectrum. This is shown by a non-zero value 211 for the zero tone, a non-zero value 212 for the eighth tone, a non-zero value 213 at the sixteenth tone, a non-zero value 214 for the twenty-fourth tone, and so forth. FIG. 2 also shows a time domain waveform 220 for acknowledgement signal 200 where a same waveform is repeated K=8 times as shown by the repetitions 211-218 of acknowledgement signal 200. In some examples, the K repetitions are transmitted using one symbol period. And although the embodiments of FIG. 2 show the acknowledgement signal using a K value of 8, one of ordinary skill would understand that other K values or signal fractions are both practical and possible. One of ordinary skill would also understand that even though the frequency scale of FIG. 2 is based on frequency units of 1, any suitable scaling of the frequency is possible based on the bandwidth and/or modulations frequencies available for acknowledgement signal 200. In addition, one of ordinary skill would also understand that the heights of non-zero values 211-214 and the shape of repetitions 221-228 are representative only and that, in practice, the heights of the non-zero tones and the shape of the repetitions would vary based on a value encoded onto acknowledgement signal 200. In some examples, because of its discrete Fourier transform properties, acknowledgement signal 200 is partially decodable when used in conjunction with orthogonal frequency division multiplexing (OFDM).

In some examples, the partial OFDM symbol may be used to reduce the RTT by allowing the sender to receive and react to acknowledgement signal 200 after receiving any one of the repetitions 221-228 and before the receiver returns all of the repetitions 221-228 of acknowledgement signal 200. This provides additional processing time for the handling of other messaging. In some examples, repetition of the partially decodable OFDM symbols results in the transmitting of a complete and fully decodable acknowledgement signal 200 as is discussed in further detail below. In some examples, the partially decodable symbols may also be processed using weighted overlap add (WOLA), from either the transmitter or receiver side, to address concerns about inter-channel interference (ICI) due to partial symbol reception, reduced signal to noise ratio, and/or the like.

According to some embodiments, use of acknowledgement signal 200 may provide one or more advantages over systems not using acknowledgement signals with a partially decodable structure. In some examples, acknowledgement signal 200 may provide an early receivable status, control, and/or acknowledgement message for use during HARQ. In some examples, the reduced RTT when using acknowledgement signal 200 may provide additional processing time to handle other messaging. In some examples, by controlling the value of K and the 1/K fraction of the symbol that is partially decodable, a tradeoff between time spent on receiver processing of acknowledgement signal 200 on the communication channel and the processing (power) gain may be optimized to achieve different processing timeline throughput properties, communication channel efficiencies, and/or the like. In some examples, acknowledgement signal 200 and its partially decodable properties introduce no ICI from the control channel on which acknowledgement signal 200 is sent to the data channel on which the data message is sent because a full symbol is always sent even when acknowledgement signal 200 is recognized and reacted to before all of the repetitions 221-228 are received. In some examples, the ICI from the data channel to the control channel due to the partial reception may be mitigated using a suitable guard band and/or WOLA.

Figure 3:
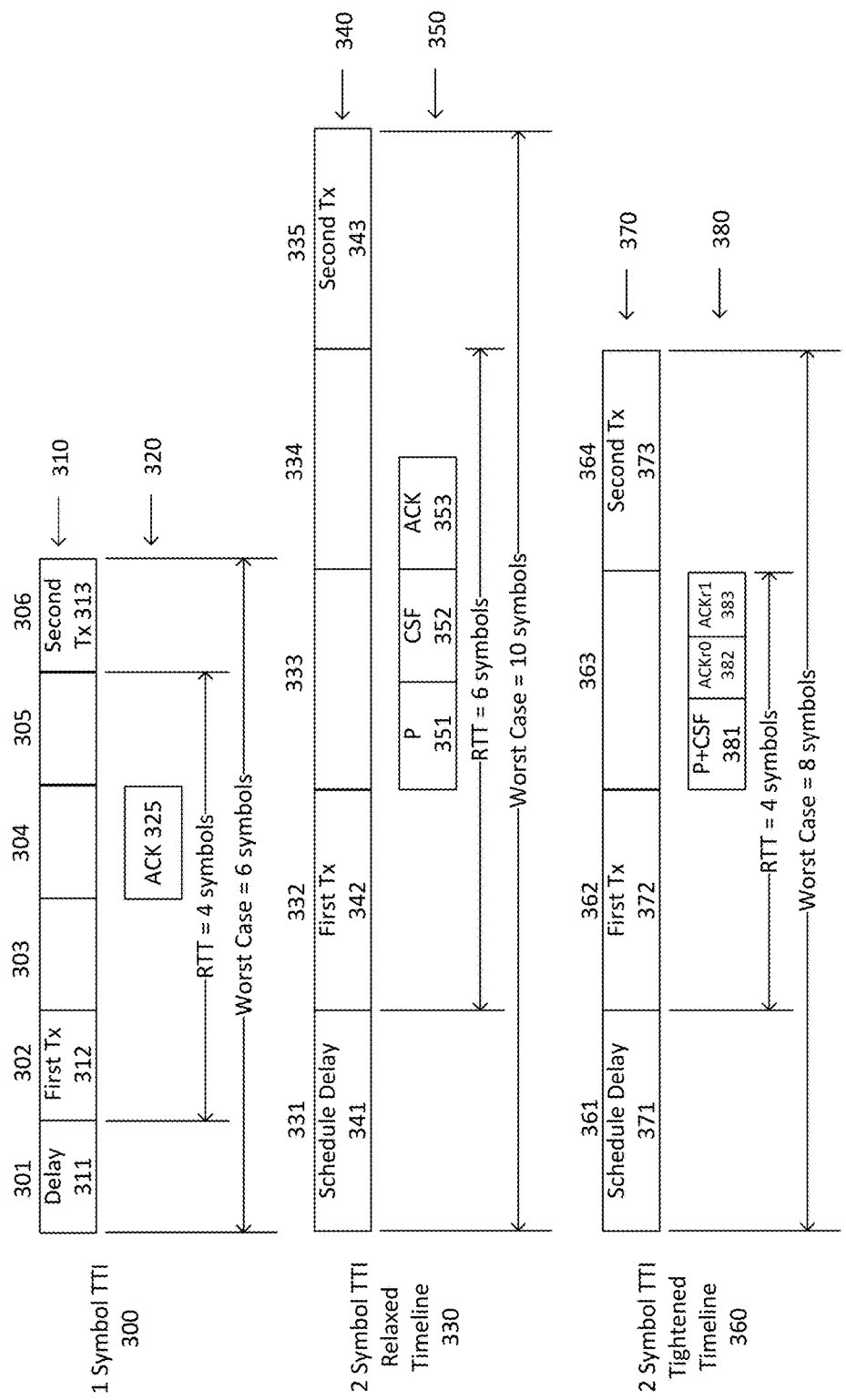
FIG. 3 is a simplified diagram of round trip times for acknowledgement signals according to some embodiments.

FIG. 3 is a simplified diagram of round trip times for acknowledgement signals according to some embodiments. FIG. 3 shows three scenarios 300, 330, and 360 for RTT using acknowledgement signals with various properties. In some examples, scenarios 300, 330, and/or 360 may demonstrate the exchange of data and control information in data and control channels between communication units, such as communication units 110 and/or 120. Messaging using a transmission time interval (TTI) length of one symbol with a fully decodable acknowledgement signal is shown in a scenario 300. Scenario 300 shows activity over six TTIs 301-306 for both a data channel 310 and a control channel 320. As shown, an optional scheduled delay 311 is inserted into data channel 310 during TTI 301. After scheduled delay 311, a first data packet is transmitted in data channel 310 during TTI 302 as first data transmission 312. TTI 303 is then idle while the receiver of the first data packet 312 uses TTI 303 to process first data transmission 312 to determine whether the first data packet is received without error and to determine the type of acknowledgement (positive, negative, ECC request, and/or the like) should be returned. During TTI 304, the receiver returns a fully decodable acknowledgement signal 325 using control channel 320 that encodes the acknowledgement. TTI 305 is then idle while the transmitter of first data transmission 312 processes fully decodable acknowledgement signal 325 to determine whether to send a second data packet, resend the first data packet, or send ECC information. TTI 306 is then used by the transmitter to transmit a second data transmission 313 including the first data packet, the second data packet, or the ECC information as appropriate. Thus, the RTT with the fully decodable acknowledgement signal 325 is typically four symbol periods with a worst-case time of six symbol periods when scheduled delay 311 occurs and second transmission 313 is used.

Messaging using a TTI length of two symbols and relaxed timing is shown in a scenario 330. Scenario 330 shows activity over five TTIs 331-335 for both a data channel 340 and a control channel 350. As shown, an optional scheduled delay 341 is inserted into data channel 340 during TTI 331. After scheduled delay 341, a first data packet is transmitted in data channel 340 during TTI 332 as a first data transmission 342. The receiver then returns a pilot 351 and channel state feedback 352 in control channel 350 during TTI 333 while the receiver concurrently decodes the first data packet included in first data transmission 342. The receiver then, based on the decoding of the first data packet, transmits a suitable acknowledgement signal 353 during TTI 334 in control channel 350. As shown, acknowledgement signal 353 occupies a full symbol period and a second full symbol period during the second half of TTI 334 is then idle The sender may begin processing the acknowledgement signal during the second half of TTI 334 to determine whether the sender should resend the first data packet, send a second data packet, or send ECC information in data channel 340 during TTI 335 as a second data transmission 343. Thus, the RTT is reduced because data channel 340 does not remain idle for a full TTI between the acknowledgement signal and second data transmission 343, such as is the case for TTI 305 between acknowledgement signal 325 and second data transmission 313. Thus, in scenario 330, the RTT is typically six symbol periods with a worst case time of ten symbol periods when scheduled delay 341 occurs and second data transmission 343 is used.

Scenario 360 demonstrates the advantages of using an acknowledgement signal with a partially decodable structure, such as the acknowledgement signal of FIG. 2. Scenario 360 shows messaging using a TTI length of two symbols with a tightened timeline and use of the acknowledgement signal with a partially decodable structure. Scenario 360 shows activity over four TTIs 361-364 for both a data channel 370 and a control channel 380. As shown, an optional scheduled delay 371 is inserted into data channel 370 during TTI 361. After scheduled delay 371, a first data packet is transmitted in data channel 370 during TTI 362 as a first data transmission 372. The receiver then returns pilot and channel state feedback 381 in control channel 380 during a first symbol of TTI 363 while the receiver concurrently decodes the first data packet included in first data transmission 372. The receiver then, based on the decoding of the first data packet, transmits a suitable acknowledgement signal during the second symbol of TTI 363 in control channel 380. As shown, the acknowledgement signal has a partially decodable structure that includes two repetitions 382 and 383. When the sender is able to decode the acknowledgement signal based on the first repetition 382, the sender may begin processing the acknowledgement signal during TTI 363 to determine whether the sender should resend the first data packet, send a second data packet, or send ECC information in data channel 370 during TTI 364 as a second data transmission 373. Thus, the RTT is further reduced over scenarios 300 and 330 because a gap in data channel 370 used for processing the acknowledgement signal is just a single TTI (363) rather than three TTIs (303-305) as shown in scenario 300 or two TTIs (333 and 334) as shown in scenario 330. Using the messaging of scenario 360, a typical RTT of four symbol periods (as good as the full acknowledgement usage in scenario 300 despite the use of the longer two symbol TTIs) is obtained along with a worst-case time of eight symbol periods when scheduled delay 371 and second data transmission 373 are used.

Although not shown, additional scenarios are possible, including modifying scenario 300 to use an acknowledgement signal with a partially decodable structure during TTI 303, which results in a typical RTT of three symbol periods and a worst-case time of five symbol periods. Thus, the use of acknowledgement signals with a partially decodable structure may be used to reduce the typical RTT time by one or two symbol periods and the worst-case time by two or four symbol periods, depending upon whether TTI lengths of one or two symbol periods are used.

Figure 4:
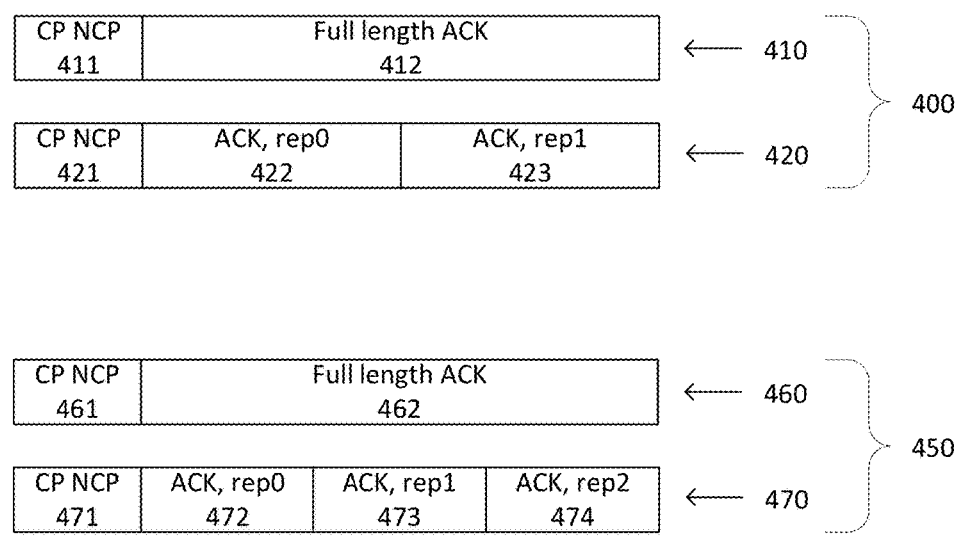
FIG. 4 is a simplified diagram of round trip time savings when using acknowledgement signals having a partially decodable structure according to some embodiments.

FIG. 4 is a simplified diagram of round trip time savings when using acknowledgement signals having a partially decodable structure according to some embodiments. Scenario 400 shows a comparison of a message 410 with a fully decodable acknowledgement signal and a message 420 with an acknowledgement signal with a partially decodable structure that includes two repetitions. Message 410 includes a cyclic prefix (CP) 411 and a fully decodable acknowledgement signal 412, which uses a full symbol to transmit. In contrast, message 420 includes a cyclic prefix (CP) 421 and an acknowledgement signal with a partially decodable structure including a first repetition 422 and a second repetition 423. In some examples, the acknowledgement signal with a partially decodable structure may be consistent with the acknowledgement signals with a partially decodable structure described above with respect to FIGS. 2 and 3. Comparison of messages 410 and 420 demonstrates the round trip time advantages of acknowledgement signals with a partially decodable structure. More specifically, fully decodable acknowledgement signal 412 is not decodable until it is fully transmitted and received. In contrast, the acknowledgement signal with a partially decodable structure of message 420 may be decoded after reception of first repetition 422 allowing a response to message 420 to be formatted and made ready for transmitting while second repetition 423 is being transmitted. Thus, in message 420, one half of the acknowledgement transmission time may be freed up for other processing allowing the RTT to be correspondingly reduced. In some examples, decoding the acknowledgement signal with a partially decodable structure based on just first repetition 422 may result in a reduction in the signal to noise ratio for the acknowledgement signal portion of message 420 relative to the signal to noise ratio for message 410 with the fully decodable acknowledgement signal 412.

Scenario 450 shows a comparison of a message 460 with a fully decodable acknowledgement signal and a message 470 with a acknowledgement signal with a partially decodable structure that includes three repetitions during the same corresponding time interval. Message 460 includes a cyclic prefix (CP) 461 and a fully decodable acknowledgement signal 462. In contrast, message 470 includes a cyclic prefix (CP) 471 followed by a first 472, second 473, and third 474 repetition of an acknowledgement signal with a partially decodable structure. In some examples, the acknowledgement signal with a partially decodable structure may be consistent with the acknowledgement signals with a partially decodable structure described above with respect to FIGS. 2 and 3. Comparison of messages 460 and 470 demonstrates the round trip time advantages of acknowledgement signals with a partially decodable structure. More specifically, fully decodable acknowledgement signal 462 is not decodable until it is fully transmitted and received. In contrast, the acknowledgement signal with a partially decodable structure of message 470 may be decoded after reception of first repetition 472 or second repetition 473 allowing a response to message 470 to be formatted and made ready for transmitting while the remaining repetitions are being transmitted. Thus, in message 470, one third or two thirds of the acknowledgement transmission time may be freed up for other processing allowing the RTT to be correspondingly reduced. In some examples, decoding the acknowledgement signal with a partially decodable structure based on just first repetition 472 may result in a reduction in the signal to noise ratio for the acknowledgement signal portion of message 470 relative to the signal to noise ratio for message 460 with the fully decodable acknowledgement signal 462, and decoding the acknowledgement signal with a partially decodable structure based on the first 472 and second 473 repetitions may result in a reduction in the signal to noise ratio for the acknowledgement signal portion of message 470 relative to the signal to noise ratio for message 460 with the fully decodable acknowledgement signal 462. In some examples, a trade-off between RTT reduction and reduction in signal to noise ratio may be used to balance throughput for the data channel versus levels of noise in the control channel.

In some examples using similar message durations, a acknowledgement signal with a partially decodable structure that includes four repetitions that take the same time to transmit as a corresponding fully decodable acknowledgement signal may be decoded after the first, second, or third repetition. In some examples, this may be used to provide additional time for decoding of the acknowledgement signal with a partially decodable structure and preparing a next data transmission at the expense of signal to noise ratio, with the reduction in signal to noise ratio dependent on the number of repetitions of the acknowledgement signal used for the decoding. In some examples, using acknowledgement signals with a partially decodable structure including more than four repetitions may provide additional flexibility in balancing gains in processing time and RTT versus reductions in signal to noise ratio.

In some embodiments, the acknowledgement signals with a partially decodable structure in FIG. 4 may also have other advantages. When an acknowledgement signal with a partially decodable structure is transmitted with full symbol length, there is no ICI from the control channel to the data channel. In some examples, there may be some ICI from the data channel to the control channel due to the loss of orthogonality in the acknowledgement signal with a partially decodable structure and the partial reception of the acknowledgement signal with a partially decodable structure, but this is generally not a big concern for the control channel. In some examples, the ICI floor from the data channel to the control channel may be kept above 10 dB. In some examples, the ICI floor from the data channel to the control channel may be improved by using WOLA.

Figure 5:
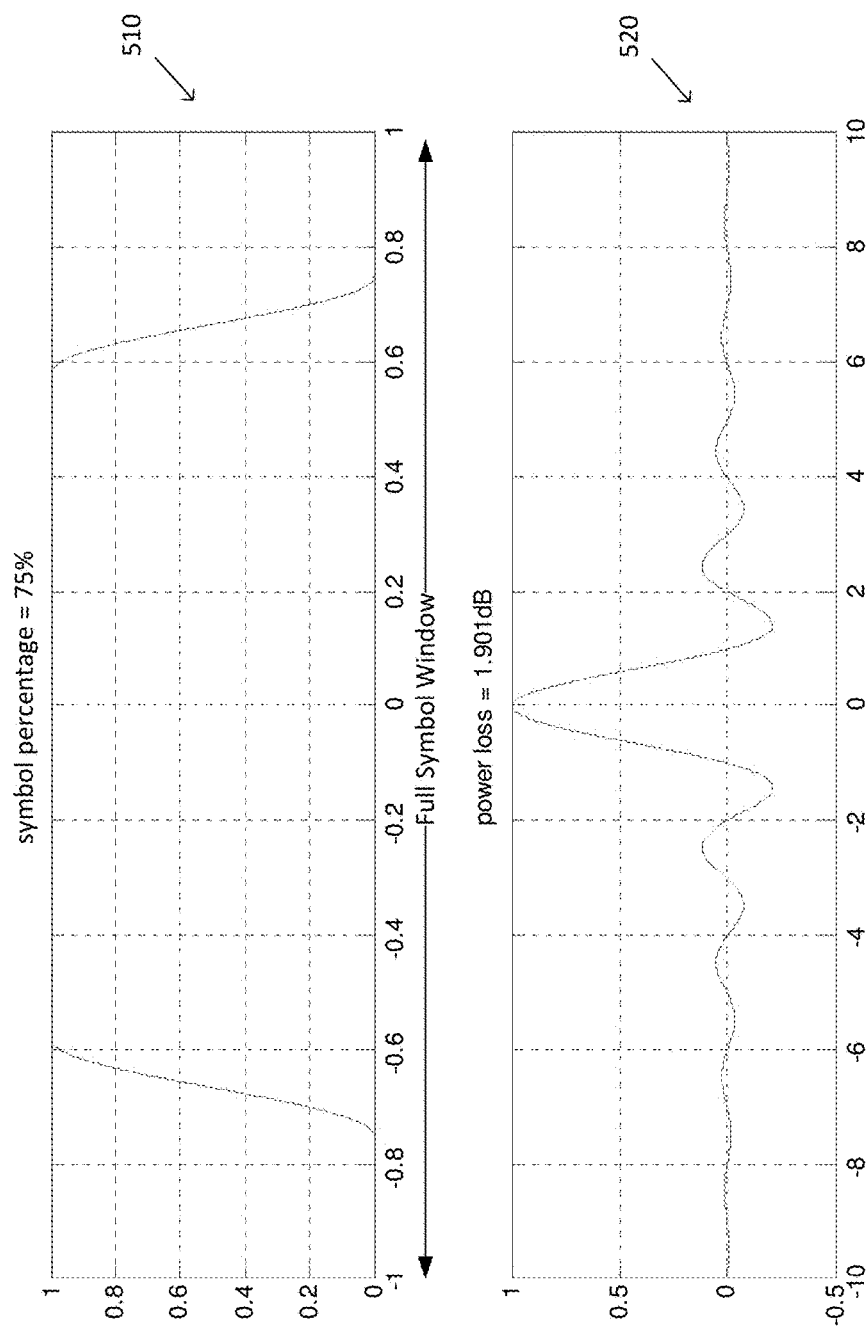
FIG. 5 is a simplified diagram of an acknowledgement signal having a partially decodable structure and using weighted overlap add roll off according to some embodiments.

FIG. 5 is a simplified diagram of an acknowledgement signal having a partially decodable structure and using weighted overlap add (WOLA) roll off according to some embodiments. In some examples, the acknowledgement signal with a partially decodable structure of FIG. 5 is consistent with the acknowledgement signals with a partially decodable structure of FIGS. 2-4. As shown in FIG. 5, a time domain transmission window 510 and a power spectral density 520 of an acknowledgement signal with a partially decodable structure is shown that uses two thirds of a symbol window and a WOLA roll-off factor of one eighth. As shown by the time domain transmission window 410, the acknowledgement signal with a partially decodable structure is provided over about 75% of the width of a full symbol that has been broadened using a WOLA roll-off factor of one eighth. The WOLA roll-off factor reduces the effects of using a transmission window with square edges. As shown, the acknowledgement symbol with a partially decodable structure of FIG. 4 frees up about 25% of the symbol duration for additional processing time. In addition, the power spectrum of the frequency domain characterization 420 shows a power loss of 1.9 dB and better frequency roll-off characteristics than the transmission window with square edges.

According to some embodiments, the acknowledgement signals with a partially decodable structure of FIGS. 2-5 may be used as an alternative to and/or to supplement timing advance. In some examples, timing advance may be used to gain processing time in an LTE base station/evolved node B (eNb) by allowing the acknowledgement signal to be returned early by sending it partway through the earlier symbol period. In some examples, timing advance works by balancing processing time between user equipment and the LTE base station so that as the acknowledgement signal is sent earlier it reduces the processing time available to the data receiver and provides it to the data transmitter. In some examples, acknowledgement signal processing may be used to reduce the symbol transmission duration for the acknowledgement signal used during timing advance. In some examples, the power savings due to the reduced power of the acknowledgement signal with a partially decodable structure is not achievable by timing advance.

According to some embodiments, additional techniques may be used to address any undesirable reduction in signal-to-noise ratio caused by the use of acknowledgement signals with a partially decodable structure. In some examples, frequency domain tone interleaving, such as that used by interleaved single carrier frequency division multiplexing, may be used to increase the power of the acknowledgement signals with a partially decodable structure. In some examples, the spatial diversity of the receiver of the acknowledgement signals with a partially decodable structure may be improved by adding one or more additional antennas.

Figure 6:
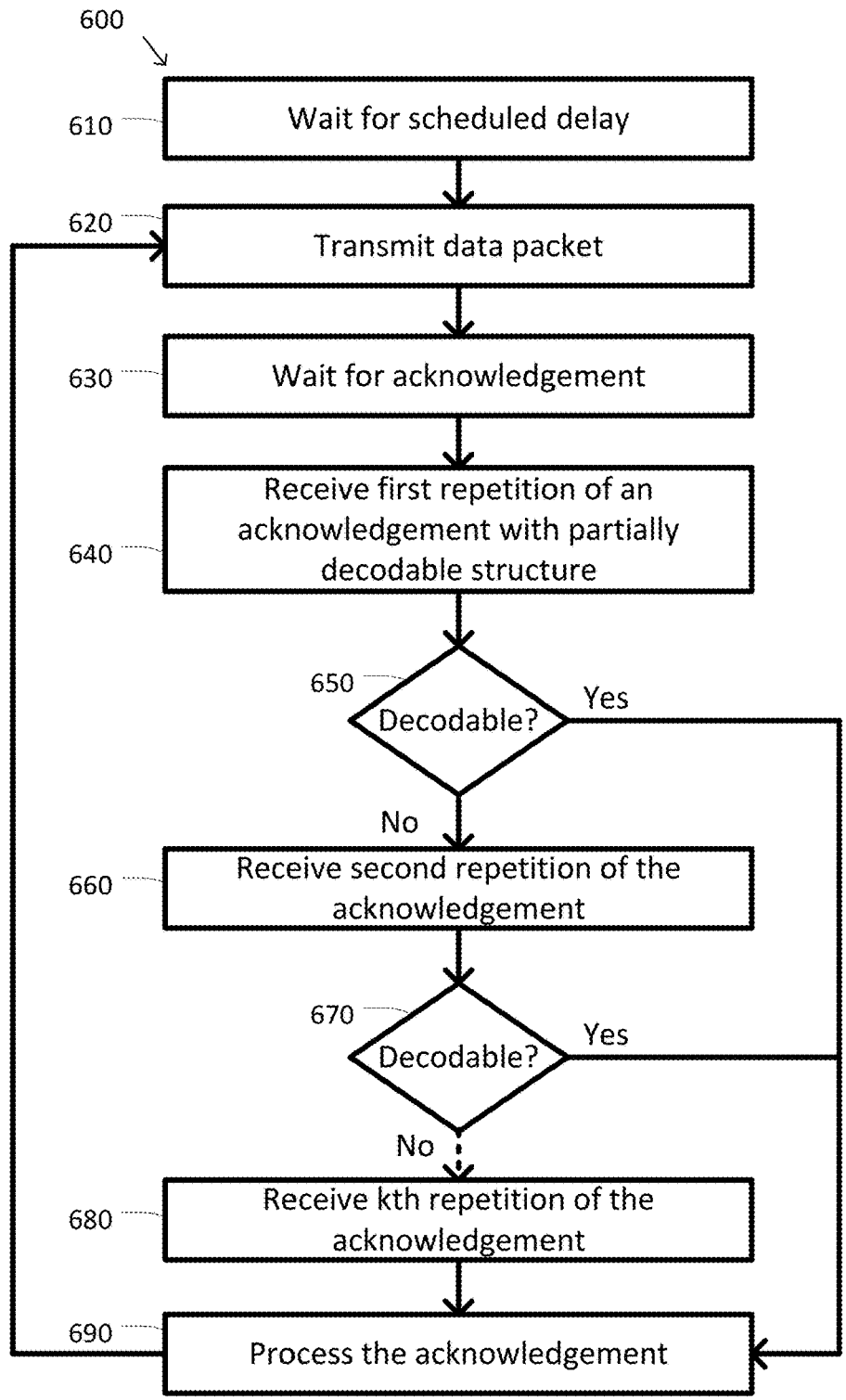
FIG. 6 is a simplified diagram of a method of sending messages according to some embodiments.

FIG. 6 is a simplified diagram of a method 600 of sending messages according to some embodiments. In some examples, one or more of the processes 610-690 of method 600 may be implemented, at least in part, in the form of executable code stored on non-transient, tangible, machine readable media that when run by one or more processors (e.g., processors 112 and/or 122 and/or signal processors 114 and/or 124) may cause the one or more processors to perform one or more of the processes 610-690. In some examples, method 600 may be used by a communication unit, such as communication units 110 and/or 120, to transmit data to another communication unit. In some embodiments, process 610 is optional and may be omitted. In some embodiments, method 600 may be used to divide repetitions of an acknowledgement signal with a partially decodable structure into two groups: a first group of repetitions used to decode the acknowledgement signal and a second group of repetitions that are not included in the decoding.

At an optional process 610, a scheduled delay is used. In some examples, the sender of a data message, such as communication unit 110 and/or 120, may wait or delay one or more symbol periods or TTIs before beginning the transmitting of the data message. In some examples, the scheduled delay may be part of a larger communication protocol, to address possible signal collisions in a transmission medium, and/or the like. In some examples, the sender may use a timer or similar mechanism to wait for the one or more symbol periods or TTIs. In some examples, the scheduled delay may be consistent with any of the scheduled delays 311, 341, and/or 371.

At a process 620, a data packet is transmitted. Using a transmitter, such as transmitter 116 and/or 126, the sender transmits at least a portion of the data in a data packet on a data or similar channel of a transmission medium, such as medium 130, to a receiver. In some examples, the data channel may be data channels 310, 340, and/or 370 and the data packet may be consistent with any of the data packets 312, 313, 342, 343, 372, and/or 373.

At a process 630, the sender waits for an acknowledgement from the receiver. After transmitting the data packet during process 620, the sender waits for the receiver of the data packet to acknowledge receipt of the data packet. In some examples, the sender may monitor a control or similar channel for a signal, packet, message, and/or the like containing an acknowledgement of the data packet. In some examples, the sender may use a receiver, such as receiver 118 and/or 128, to detect signals, framing, preambles, cyclic prefixes, and/or the like on the control channel indicative of an acknowledgement. In some examples, the sender may by protocol, convention, and/or the like expect the acknowledgement signal to be received based on a period of time that is based on a known symbol, TTI, and/or other related time interval. In some examples, the length of delay may depend on a bandwidth of the data channel, the size of the data packet, the amount of time the receiver uses to decode and check the data packet, and/or the like.

At a process 640, a first repetition of an acknowledgement with a partially decodable structure is received. In some examples, the sender may use the receiver, such as receiver 118 and/or 128, to receive the first repetition of the acknowledgement. In some examples, the first repetition of the acknowledgement may be one of many repetitions of an acknowledgement signal with partially decodable properties. In some examples, the first repetition may be consistent with any of the repetitions 221-228, 282, 283, 422, 423, and/or 472-274.

At a process 650, it is determined whether the first repetition of the acknowledgement is decodable. Depending on the signal to noise ratio of the control channel, it may not be possible for the sender to decode the first repetition of the acknowledgement received during process 640. In some examples, the sender may analyze the first repetition of the acknowledgement to determine whether expected framing, frequency components, and/or the like are present. In some examples, the sender may validate the first repetition of the acknowledgement using parity, check sum, and/or other error detection approaches as part of the decoding. When the first repetition of the acknowledgement is decodable, the acknowledgement is processed using a process 690. When the first repetition of the acknowledgement is not decodable, a second repetition of the acknowledgement is received using a process 660.

At the process 660, a second repetition of the acknowledgement is received. In some examples, the sender may use the receiver, such as receiver 118 and/or 128, to receive the second repetition of the acknowledgement. In some examples, the second repetition may be consistent with any of the repetitions 221-228, 282, 283, 422, 423, and/or 472-274.

At a process 670, it is determined whether the combination of the first and second repetitions of the acknowledgement is decodable. Depending on the signal to noise ratio of the control channel, it may not be possible for the sender to decode the combination of the first and second repetitions of the acknowledgement received during process 660. In some examples, the sender may analyze the combination of the first and second repetitions of the acknowledgement to determine whether expected framing, frequency components, and/or the like are present. In some examples, the sender may validate the combination of the first and second repetitions of the acknowledgement using parity, check sum, and/or other error detection approaches as part of the decoding. When the combination of the first and second repetitions of the acknowledgement is decodable, the acknowledgement is processed using the process 690. When the combination of the first and second repetitions of the acknowledgement is not decodable, one or more additional repetitions of the acknowledgement is received.

Depending on the number of repetitions of the acknowledgement in the acknowledgement signal, processes similar to processes 660 and 670 are repeated until a kth and last repetition of the acknowledgement is received during process 680. In some examples, the sender may use the receiver, such as receiver 118 and/or 128, to receive the kth repetition of the acknowledgement. In some examples, the kth repetition may be consistent with any of the repetitions 221-228, 282, 283, 422, 423, and/or 472-274.

At the process 690, the acknowledgement is processed. The combined repetitions of the acknowledgement received during processes 640, 660, . . . , and/or 680 are analyzed by the sender to determine the content of the acknowledgement. In some examples, the content of the acknowledgement may be a positive acknowledgement when the receiver successfully received and decoded the data packet transmitted during process 620, a negative acknowledgement when the receiver was not able to successfully receive or decode the data packet transmitted during process 620, a request for error correction codes when Type II HARQ is used and errors were detected by the receiver in the data packet transmitted during process 620, and/or the like. Based on the content of the acknowledgement, the sender may then return to process 620 to transmit another data packet where, in response to a positive acknowledgement, the another data packet is more data to be transmitted, in response to a negative acknowledgement, the another data packet is a resend of the data packet previously transmitted, and, in response to a request for error correction codes, the another data packet includes error correction codes for the data packet previously transmitted during process 620.

As discussed above and further emphasized here, FIG. 6 is merely an example which should not unduly limit the scope of the claims. One of ordinary skill in the art would recognize many variations, alternatives, and modifications. In some embodiments, method 600 may include additional processes for handling lost packets and/or unacknowledged packets. In some examples, the sender may start a timer after transmitting the data packet in process 620 and then retransmit the data packet when no acknowledgement is received. In some examples, more complex combinations of acknowledgements than those described in process 690 may be used, such as when an acknowledgement may acknowledge more than one data packet, selective retransmittings are supported, and/or the like, which are often practiced with sliding windows protocols. In some embodiments, one or more of processes 650, 670, and/or the like may be omitted when the transmitter waits until after receiving two or more of the repetitions of the acknowledgement before attempting to decode the acknowledgement. In some embodiments, the number of repetitions of the acknowledgement received and decoded may depend on how many repetitions are included in the acknowledgement. In some examples, the number of repetitions may be established by protocol, agreement between the sender and receiver, and/or the like. In some embodiments, an additional determination of whether the combined repetitions of the acknowledgement received during processes 640, 660, . . . , and 680 may occur between processes 680 and 690. In some examples, when the combined repetitions of the acknowledgement are not decodable, the sender may assume that the acknowledgement is a negative acknowledgement during process 690 so that the data packet transmitted during process 620 is retransmitted when method 600 returns to process 620.

Figure 7:
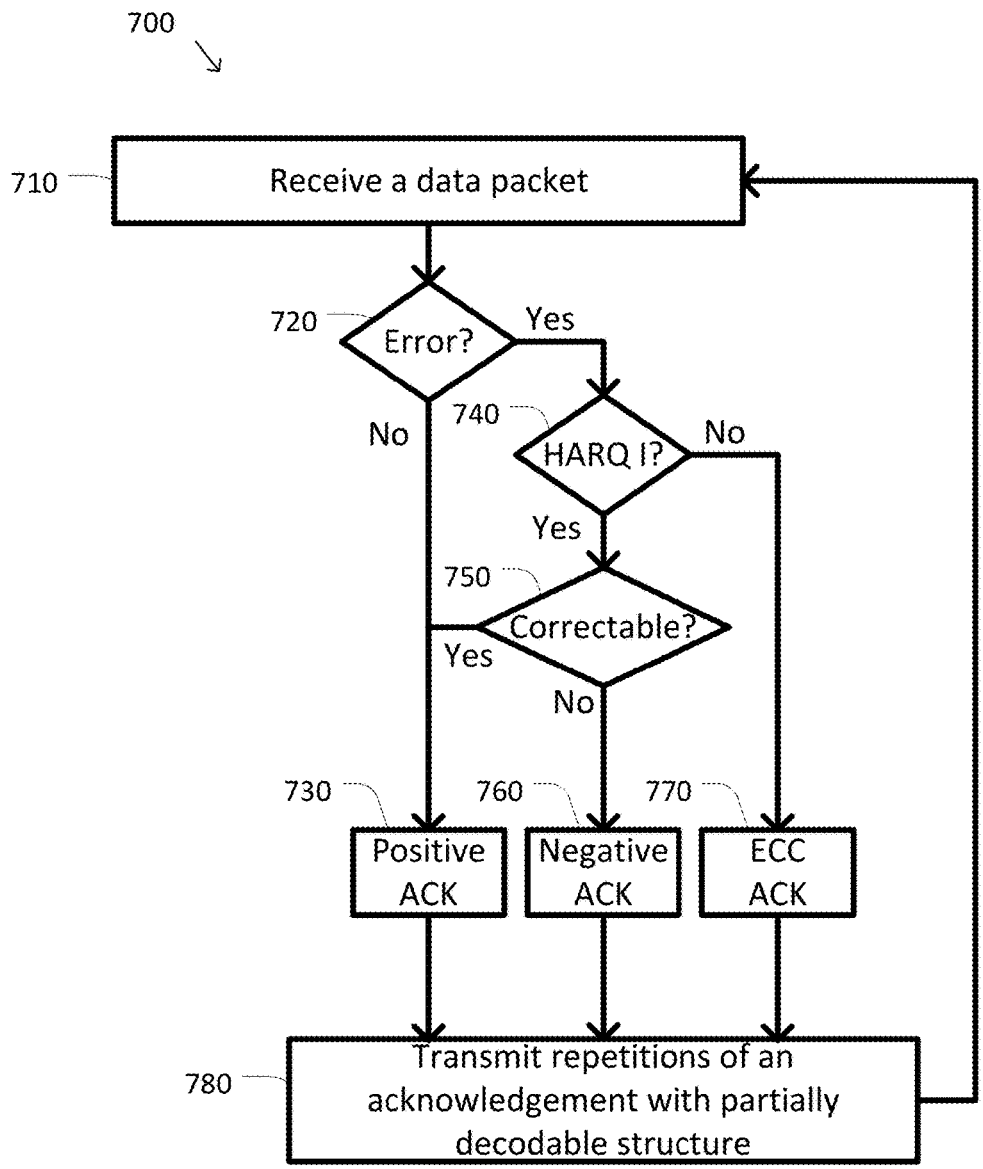
FIG. 7 is a simplified diagram of a method of receiving messages according to some embodiments.

FIG. 7 is a simplified diagram of a method 700 of receiving messages according to some embodiments. In some examples, one or more of the processes 710-780 of method 700 may be implemented, at least in part, in the form of executable code stored on non-transient, tangible, machine readable media that when run by one or more processors (e.g., processors 112 and/or 122 and/or signal processors 114 and/or 124) may cause the one or more processors to perform one or more of the processes 610-690. In some examples, method 700 may be used by a communication unit, such as communication units 110 and/or 120, to receive data from another communication unit.

At a process 710, a data packet is received. Using a receiver, such as receiver 118 and/or 128, the receiving communication unit, such as communication unit 110 and/or 120, receives a data packet on a data or similar channel of a transmission medium, such as medium 130, from a sender. In some examples, the data channel may be data channels 310, 340, and/or 370 and the data packet may be consistent with any of the data packets 312, 3313, 342, 343, 372, and/or 373. In some examples, the data packet may be the data packet transmitted during process 620 of a corresponding sender.

At a process 720, it is determined whether the data packet is received with errors. In some examples, the receiver may use error detecting codes, such as parity bits, check sums, CRC codes, and/or the like included in the data packet received during process 710 to determine whether the data packet includes errors. When no errors are detected, a positive acknowledgement is generated using a process 730. When errors are detected, it is determined whether Type I HARQ is being used using a process 740.

At the process 730, a positive acknowledgement is generated. An acknowledgement message is formed that includes a payload indicating that the data packet received during process 710 was received without errors. In some examples, the payload may include a packet and/or some other type of sequence identifier that identifies the data packet. The positive acknowledgementacknowledgement message is then transmitted using a process 780.

At the process 740, it is determined whether Type I HARQ is being used. In some examples, Type I HARQ may be in use based on parameters of a data exchange protocol between the receiver and the send of the data packet received during process 710. In some examples, the receiver may be provisioned to use Type I HARQ. When Type I HARQ is being used, it is determined whether the error in the data packet detected during process 720 may be corrected using a process 750. When Type I HARQ is not being used, an acknowledgement that requests error correction codes is generated using a process 770.

At the process 750, it is determined whether the errors in the data packet may be corrected. When Type I HARQ is being used to exchange data between the receiver and the sender of the data packet received during process 710, the data packet further includes error correction codes that may be usable to correct the errors in the data packet received during process 710. In some examples, the error correcting codes may include parity bits, checksums, hamming codes, and/or the like. Using the error correcting codes in the data packet, the receiver determines whether the errors detected during process 720 may be corrected so that an error-free form of the data packet received during process 710 may be constructed. When the errors are correctable and an error free data packet is recovered, a positive acknowledgement is generated using the process 730. When the errors are not correctable, a negative acknowledgement is generated using a process 760.

At the process 760, a negative acknowledgement is generated. An acknowledgement message is formed that includes a payload indicating that the data packet received during process 710 was received with errors and the correct data packet could not be recovered. The negative acknowledgement message requests that the sender resend the data packet sent during process 710. In some examples, the payload may include a packet and/or some other type of sequence identifier that identifies the data packet. The negative acknowledgementacknowledgement message is then transmitted using the process 780.

At the process 770, an acknowledgement requesting error correction codes is generated. When TYPE II HARQ is being used to exchange data between the receiver and the sender of the data packet received during process 710, a receiver upon detecting errors in a data packet may request error correction codes from the sender. To do this, the sender forms an acknowledgement message that includes a payload requesting error correction codes for the data packet received during process 710 was received with errors. In some examples, the payload may include a packet and/or some other type of sequence identifier that identifies the data packet. The acknowledgementacknowledgement message requesting error correction codes is then transmitted using the process 780.

At the process 780, repetitions of a acknowledgement are transmitted. Using the acknowledgementacknowledgement message generated during processes 730, 760, and/or 770, the receiver formats the acknowledgement message as an acknowledgement signal having partially decodable properties. In some examples, the acknowledgement signal may be consistent with the acknowledgementacknowledgement signals of FIGS. 2-5 and the repetitions may be consistent with any of the repetitions 221-228, 382, 383, 422, 423, 471, 472, and/or 473. In some examples, the number of repetitions may be set based on protocol settings, prior agreement between the receiver and the sender of the data packet received during process 710, and/or the like. In some examples, the repetitions may be transmitted one after another in a control or similar channel, such as any of control channels 320, 350, and/or 380 using a transmitter, such as transmitter 116 and/or 126, back to the sender of the data packet received during process 710. In some examples, the repetitions may be the repetitions received by the sender in corresponding processes 640, 660, . . . , and 680 of the sender. After transmitting the repetitions of the acknowledgement, the receiver returns to process 710 to wait for another data packet containing a resend of the data packet previously received during process 710, another data packet, or error correction codes for the data packet previously received during process 710.

Some examples of communication units 110 and/or 120 may include non-transient, tangible, machine readable media that include executable code that when run by one or more processors (e.g., processors 112 and/or 122 and/or signal processors 114 and/or 124) may cause the one or more processors to perform the processes of methods 600 and/or 700 as described above. Some common forms of machine readable media that may include the processes of methods 600 and/or 700 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications.

What is claimed is:

1. A communication unit comprising:
   a processor;
   a transmitter coupled to the processor; and
   a receiver coupled to the processor;
   wherein the processor is configured to:
   transmit, using the transmitter, a data message to another communication unit on a data channel;
   receive, using the receiver, one or more first repetitions of an acknowledgement signal from the another communication unit on a control channel, the acknowledgement signal having a partially decodable structure; and
   decode the acknowledgement signal prior to fully receiving, via the receiver, a last repetition of one or more second repetitions of the acknowledgement signal on the control channel;
   wherein each repetition in the one or more first repetitions and the one or more second repetitions of the acknowledgement signal are repetitions of a same time domain waveform received during one symbol period.

2. The communication unit of claim 1, wherein a frequency domain characteristic of the time domain waveform consists of one non-zero tone for every K tones, K being equal to a sum of a number of repetitions in the one or more first repetitions and a number of repetitions in the one or more second repetitions.

3. The communication unit of claim 2, wherein the number of repetitions in the one or more first repetitions is chosen to balance latency and reliability.

4. The communication unit of claim 1, wherein each repetition in the one or more first repetitions and the one or more second repetitions of the acknowledgement signal includes a weighted overlap add (WOLA) roll off.

5. The communication unit of claim 1, wherein a round trip time between the transmitting of the data message and scheduling of a subsequent transmitting by the transmitter is reduced relative to use of a fully decodable acknowledgement signal.

6. The communication unit of claim 5, wherein the subsequent transmitting is a retransmitting of the data message.

7. A method of transmitting messages, the method comprising:
   transmitting, by a sender, a data message to a receiver on a data channel;
   receiving, by the sender, one or more first repetitions of an acknowledgement signal from the receiver on a control channel, the acknowledgement signal having a partially decodable structure; and
   decoding, by the sender the acknowledgement signal prior to fully receiving a last repetition of one or more second repetitions of the acknowledgement signal on the control channel;
   wherein each repetition in the one or more first repetitions and the one or more second repetitions of the acknowledgement signal are repetitions of a same time domain waveform received during one symbol period.

8. The method of claim 7, wherein a frequency domain characteristic of the time domain waveform consists of one non-zero tone for every K tones, K being equal to a sum of a number of repetitions in the one or more first repetitions and a number of repetitions in the one or more second repetitions.

9. The method of claim 8, wherein the number of repetitions in the one or more first repetitions is chosen to balance latency and reliability.

10. The method of claim 7, wherein each repetition in the one or more first repetitions and the one or more second repetitions of the acknowledgement signal includes a weighted overlap add (WOLA) roll off.

11. The method of claim 7, wherein a round trip time between the transmitting of the data message and scheduling of a subsequent transmitting by the sender is reduced relative to use of a fully decodable acknowledgement signal.

12. A communication unit comprising:
a processor;
a transmitter coupled to the processor; and
a receiver coupled to the processor;
wherein the processor is configured to:
receive, via the receiver, a data message from another communication unit on a data channel;
decode the data message; and
transmit, via the transmitter and in response to the decoding, an acknowledgement signal on a control channel to the another communication unit, the acknowledgement signal having a partially decodable structure;
wherein transmitting the acknowledgement signal further comprises transmitting multiple repetitions of a same time domain waveform during one symbol period.

13. The communication unit of claim 12, wherein transmitting the acknowledgement signal further comprises transmitting K repetitions of a same time domain waveform with a frequency domain characteristic consisting of one non-zero tone for every K tones, K being a positive integer.

14. The communication unit of claim 13, wherein the acknowledgement signal is processable by the another communication unit using a first N out of the K repetitions, N being a positive integer less than K.

15. The communication unit of claim 13, wherein K and N are chosen to balance latency and reliability.

16. The communication unit of claim 12, wherein the processor modifies the acknowledgement signal to include a weighted overlap add (WOLA) roll off.

17. A communication unit comprising:
means for transmitting a data message to another communication unit on a data channel means;
means for receiving one or more first repetitions of an acknowledgement signal from the another communication unit on a control channel means, the acknowledgement signal having a partially decodable structure; and
means for decoding the acknowledgement signal prior to fully receiving, via the means for receiving, a last repetition of one or more second repetitions of the acknowledgement signal on the control channel means;
wherein each of the one or more repetitions in the one or more first repetitions and the one or more second repetitions of the acknowledgement signal are repetitions of a same time domain waveform received during one symbol period.

18. The communication unit of claim 17, wherein a frequency domain characteristic of the time domain waveform consists of one non-zero tone for every K tones, K being equal to a sum of a number of repetitions in the one or more first repetitions and a number of repetitions in the one or more second repetitions.

19. The communication unit of claim 18, wherein the number of repetitions in the one or more first repetitions is chosen to balance latency and reliability.

20. The communication unit of claim 17, wherein each repetition in the one or more first repetitions and the one or more second repetitions of the acknowledgement signal includes a weighted overlap add (WOLA) roll off.

21. The communication unit of claim 17, wherein a round trip time between the transmitting of the data message and scheduling of a subsequent transmitting by the means for transmitting is reduced relative to use of a fully decodable acknowledgement signal.

22. The communication unit of claim 21 wherein the subsequent transmitting is a retransmitting of the data message.

* * * * *